United States Patent [19]
Hauser et al.

[11] Patent Number: 6,061,789
[45] Date of Patent: May 9, 2000

[54] SECURE ANONYMOUS INFORMATION EXCHANGE IN A NETWORK

[75] Inventors: Ralf Ch. Hauser, Zurich, Switzerland; Gene Tsudik, Santa Monica, Calif.

[73] Assignee: International Business Machines Corporation, Armonk, N.Y.

[21] Appl. No.: 09/101,230

[22] PCT Filed: Jan. 12, 1996

[86] PCT No.: PCT/IB96/00025

§ 371 Date: Jul. 2, 1998

§ 102(e) Date: Jul. 2, 1998

[87] PCT Pub. No.: WO97/25801

PCT Pub. Date: Jul. 17, 1997

[51] Int. Cl.[7] .................................................. G09C 3/00
[52] U.S. Cl. .................. 713/168; 713/169; 713/170; 713/176; 380/255; 380/258
[58] Field of Search .................... 380/255, 258, 380/277, 285; 713/168, 169, 170, 171, 176

[56] References Cited

U.S. PATENT DOCUMENTS

| | | | |
|---|---|---|---|
| 4,870,591 | 9/1989 | Cicciarelli et al. | 705/1 |
| 4,961,224 | 10/1990 | Yung | 380/25 |
| 4,962,532 | 10/1990 | Kasiraj et al. | 380/25 |
| 5,884,270 | 3/1999 | Walker et al. | 705/1 |

*Primary Examiner*—Thomas R. Peeso
*Attorney, Agent, or Firm*—Gerald R. Woods

[57] ABSTRACT

Computer network management for electronic commerce requires technical implementations of business processes. The process addressed here is a technical method for a communication in which two or more parties legitimately want to communicate anonymously, often before discussing a deal or closing a business, e.g. for anonymous bidding or auctioning in electronic commerce. Essentially, the invention is a method, described by a protocol, for safely exchanging data in a network that provides a public key infrastructure and an anonymous communication possibility between network users. It consists of a sequence of steps in which both sender (e.g. customer) and addressee (e.g. merchant) compose data sets (i.e., requests and replies) that are based on received data and/or prior knowledge. The data sets are enciphered to provide anonymity, and digitally signed to provide proof of the partner. The invention is also a system designed to implement the invented method.

13 Claims, 2 Drawing Sheets

FIG. 1

TMP-1 = PK-m(SIG-m)
TMP-2 = H(SIG-c, MD, OD)

SECURE ANONYMOUS INFORMATION EXCHANGE IN A NETWORK

This application is a 371 of PCT/IB96/00025 filed on Jan. 12, 1996.

TECHNICAL FIELD

The present invention lies in the field of computer network management, it specifically concerns the technical implementation of a business process in a computer network environment. The processes addressed here are of the type where two or more parties legitimately want to communicate anonymously, often before they discuss a deal or close a business. The invention does not concern a business process by itself, but underlying technical methods used to execute one or the other business process. In particular, the invented method may be used for anonymous bidding or auctioning in electronic commerce.

BACKGROUND OF THE INVENTION

Obviously, both the importance and the proliferation of electronic commerce continue to grow; the Internet is a striking example. In such an environment—analogous to the traditional "non-electronic" commerce—consumer privacy is becoming a major concern.

However, the mere fact that electronic commerce is conducted over an existing open network infrastructure such as the Internet runs counter to the privacy of the consumer. Often, there are legitimate reasons for a party to remain anonymous at least during an initial stage of a developing (business) relationship with another party. But it becomes very difficult or even impossible for a party to protect or hide his/her identity when he/she addresses another party over an open network. And, of course, this anonymity issue becomes even more complex when both communicating parties want to stay anonymous.

This is essentially due to the end-to-end nature of application protocols that are mainly used as a vehicle for electronic commerce: World Wide Web (WWW), Electronic Mail, File Transfer (FTP), and others.

PRIOR ART

The anonymity issue mentioned above was already addressed before: U.S. Pat. No. 5,375,055 to Dunne et al. is an example, though in a different environment as the present invention and thus only of limited relevance. The Dunne patent discloses an electronic brokerage system in a communication network connecting traders dealing in financial instruments. In this computerized system, anonymous price quotes are distributed selectively in accordance with previously established credit limits. This system includes a so-to-speak central instance that that has all the information available, but communicates only part of it to the connected parties.

Already from the outset, this is quite different from the goal of the present system which is to provide a secure method that allows one party, e.g. a user, a consumer, or a bidder, to obtain quotes/bids/offers from another party, e.g. a prospective merchant, over an open network without sacrificing his/her privacy, i.e. while remaining anonymous.

Another specific approach is disclosed in U.S. Pat. No. 5,420,926 to Low et al. This patent describes techniques for performing credit-card transactions without disclosing the subject matter of the transaction to the institution providing the credit card. The techniques include the use of an intermediary, called communication exchange, for the exchange of information and funds without the destination for the transfer knowing the source of the information or funds. Public key encryption is used so that each party to the transaction and the communications exchange can read only the information the party or the exchange needs for its role in the transaction.

Though the Low patent describes a method for hiding transaction details from the parties concerned, it focuses on the goal to restrict each of the corresponding parties from getting more than the minimum amount of information required for executing the transaction. This is, in general, relevant to the present invention, however, the techniques proposed in the Low patent do not solve the anonymous bidding problem, which requires the exchange of sufficient detail information between two or more parties with only a minimum of intermediary action to solve the anonymity issue.

Another example for a technology that addresses the issue of privacy and anonymity of "electronic consumers" or subscribers, providing some degree of electronic privacy, is the so-called electronic/digital cash as described, e.g. by D. Chaum et al. in "Untraceable Electronic Cash" in Proceedings of CRYPTO'88, August 1988, Santa Barbara, Calif., USA.

Here, again, the situation differs from the present invention, since the information to be transmitted is restricted to financial transactions that have to be safely executed. This allows a closely formalized process with a minimum of "free text" to be considered or handled. The present invention, on the other hand, must allow practically free text communication, at least from the user side. This obviously poses additional problems not solved by digital cash implementations as the one cited above.

OBJECTS OF THE INVENTION

From the outset, the nature of most current network protocols and applications is adverse to privacy. The vast majority of protocols used have one thing in common: they faithfully communicate end-point identification information. "End-point" in this context is meant to denote a user (with an ID), a network address, or an organization name. For example, electronic mail (e-mail) routinely communicates a sender's address in its header(s). File transfer (e.g. FTP), remote login (e.g. TELNET), and hypertext browsers (e.g. WWW) expose addresses, host names and IDs of their users. This is not a problem for most applications.

However, as said above, there are legitimate reasons why a user does not want to sacrifice his/her privacy, e.g. by performing an innocent activity such as "browsing" a catalog via WWW or inquiring about some merchandise via e-mail. Particularly in the latter case, there are often sound economic reasons why a potential customer does not want to disclose his/her identity.

Starting from this, the main object of this invention is to provide a method which enables such anonymous data exchange, e.g. a method how a prospective customer may obtain bids or offers from prospective merchants without disclosing his/her identity. Another example is a user's anonymous bidding in an auction conducted over a network.

Further in this direction is it another object of the invention to disclose a method by which the offering merchant may also, selectively upon his/her desire, protect his/her privacy up to a certain point of the usual sales process—or even through the whole process.

A particular object is to provide a system that is resistant to false representations from both sides, the sender's (bidder or customer) as well as the addressee's (auctioneer or merchant).

A still further object is to employ and exploit known services, already available on many networks, for this purpose, and thus minimize the additional effort and expenditure for implementing the invention.

SUMMARY OF THE INVENTION

In a network that provides a way for anonymous communication and a public key infrastructure, and perhaps even public key certification (PKC), the invention provides a method for the desired secure, but anonymous communication. In brief, a sender initially composes an encrypted request containing a "subject question" and his/her digital signature. This request is sent anonymously to one or more addressees. Each addressee then composes an encrypted reply, including a "subject answer" and his/her digital signature. "Subject question" and "subject answer" are meant to denote corresponding pairs of information sets used in the particular business, e.g. a description of a particular merchandise and the corresponding offer from a merchant, or the request for a particular service and the corresponding offer of a service provider, or a bidder's bid at an auction and the auctioneer's answer.

The invention shall be explained in more detail by the example of anonymous bidding (which usually predates a purchase).

Prerequisites, as mentioned above, are the possibility of anonymous communication and a public key infrastructure. The process is started by a sender, usually a prospective customer or consumer, who composes an offer request with a plain, i.e. not encrypted, description of the desired product or service and his/her digital signature. One must be aware that such a digital signature does not by itself reveal the sender's identity. This offer request is sent anonymously to one or more selected addressee(s), or even broadcasted, via the network. Addressees are merchants, service providers, or the like. Since the offer request itself is in plain language, every addressee may read it and decide whether to make a bid. If an addressee decides to do so, he/she composes a reply with an offer description and his/her digital signature, which "includes" the sender's digital signature, and mails it to the sender. The addressee's public key may also have to be transmitted if it must be assumed that the sender does not have access to it. From the received message and the addressee's public key, the sender can now compute two values (a first and a second) whose matching indicates the genuineness of the offer. So much for the bidding process.

It should be clear to someone skilled in the art that the invention can be even more advantageously implemented in a network providing public key certification (PKC).

Further, an actual sale, following the bidding process above, may be organized along the same line. In this case, the sender also uses the existing public key infrastructure. The sender, i.e. the prospective customer, transmits a proof to the merchant, who, in turn, uses sender's public key to calculate a third value and determines a fourth value by applying a hash function to certain parts of the received message, and, by comparing these two latter values, determines genuineness of said offer. This makes the invented method resistant to cheating by both sender and addressee.

BRIEF DESCRIPTION OF THE DRAWINGS

In the accompanying drawings show

PREFERRED EMBODIMENTS

The method described in the following is a generic approach for obtaining bids or offers from "electronic merchants" without any sacrifice in consumer privacy. As an extension, it offers protection to the merchants by allowing them to accept only genuine bids from consumers and, if need be, reliably associate a consumer with a previously issued blind bid. Moreover, merchants can detect replays or duplicates of bids that had already been acted upon.

The anonymous bidding method according to this implementation of the invention requires certain basic security services for its proper operation: 1. a provision for anonymous message-based communication, and, 2. a public-key certification (PKC) infrastructure. Both are briefly addressed below.

First, an anonymous communication channel is required. At the start, anonymous communication is necessary to preserve anonymity of the sender, i.e. the prospective consumer in this context. It is also used to hide the location of the sender, since the sender's identity and his/her location are often tightly coupled.

There is a simple way of achieving some kind of anonymity, no matter whether synchronous or asynchronous communication is used. If the sender, i.e. the consumer, customer or bidder, works from a public terminal, the address of the latter usually does not allow identification of the party using it and thus provides anonymity.

More complex, but more secure, are networks that provide a special tool for such anonymous, message-based communication. For both synchronous (e.g. WWW) or asynchronous (e.g. usual e-mail) networks, appropriate tools are available and known. In the case of synchronous communication, a protocol specific anonymizer may be used, being essentially a program that functions as a conduit between the real sender and the addressee, hiding the identity of the sender, e.g. by using a random alias.

An example of synchronous anonymizer can be easily built on top of a network gateway/firewall such as the IBM "NetSP Secured Network Gateway for AIX", short "SNG" in the following IBM Publications:

SC31-8113—NetSP SNG Installation, Configuration and Administration Guide, and

GG24-2577—Implementing an Internet Firewall with NetSP SNG.

A typical firewall already anonymizes outgoing traffic by rewriting source addresses with its own. It is only necessary to allow the same for incoming traffic, i.e. to overwrite the source addresses with the firewall's network address, in order to make it an anonymizer.

In the case of asynchronous communication, an anonymous relay service may be used. One example is the anonymous remailer, an anonymous relay for e-mail. While anonymizers for synchronous communication are not yet widely used, anonymous remailers are widely known on the global Internet; there are many available, offering different degrees of anonymity and interoperability.

One example of a working anonymous remailer is the PENET service operated in Finland by J. Helsingius. Another is the MIXMASTER remailer distributed by L. Cottrell and operated by several sites in the US.

The PENET remailer is available from the World Wide Web, WWW, at "http://www.penet.fi". The information under this address includes a paper by J. Helsingius on remailers, entitled "Penet Anonymous Remailer Service", and addresses of remailers. The MIXMASTER remailer is available via the WWW at "http://obscura.com/≈loki/remailer-essay.html". A paper by L. Cottrell on remailers, entitled "Mixmaster and Remailer Attacks", and more information on anonymous remailers can be found under this WWW address.

Generally, anonymous bidding places almost no restrictions on the type of the anonymizing tools. The only exception is the requirement for two-way communication; in other words, it should be possible for a prospective consumer, customer, or bidder (sender) to send an anonymous request to a prospective merchant or auctioneer and for the latter to reply to the sender. This can be done in a number of ways. One method used by simple existing anonymous remailers is to set-up a table that maps real e-mail addresses into aliases; this way, an addressee (merchant) can reply to the alias that is subsequently translated into a real e-mail address by the anonymous remailer. There are also more secure and sophisticated methods such as having the sender precompute a secret return path that is then "blindly" used by the addressee. Suffice it to say that, as long as it is available, the person skilled in the art can easily select an anonymity system that satisfies the requirements. Examples for solutions to the anonymity requirement can be found in D. Chaum, "Untraceable Electronic Mail, Return Addresses and Digital Pseudonyms" in Communications of the ACM, Vol. 24, No. 2, Februbary 1981, and C. Gulcu and G. Tsudik, "Mixing Email with Babel" in Proceedings of ISOC Symposium on Network and Distributed Systems Security, February 1996, San Diego, Calif., USA.

The second requirement is a public key infrastructure. Most of them are designed as public key certification method (PKC). Such PKCs are available on networks today, serving a multitude of purposes. Currently, their most prominent use is in the area of secure electronic mail. Two widely used examples are Privacy-Enhanced Mail (PEM) and Pretty Good Privacy (PGP). PEM includes a PKC hierarchy and functions. PGP is somewhat "ad hoc", although it allows for informal certification hierarchies. It can be safely assumed that PKC will be a cornerstone of most future electronic commerce products. Such PKC methods are described in Bruce Schneier in "Applied Cryptography", New York 1995 by John Wiley and Sons, Inc.

In the detailed description below it is assumed that all relevant parties, senders/consumers and addressees/merchants, are equipped with individual public key certificates. At the very minimum, a certificate is assumed to contain the party's name, public key, validity time, and the name of the issuing authority, the latter being often referred to as "certification authority".

Notation Used

The table below gives the notation used throughout the following description, the drawings, and the claims.

| | |
|---|---|
| C,M | Consumer and Merchant, the protocol participants; technically they are "sender" and "addressee"; |
| MD | Merchandise description; |
| OD | Offer description; |
| REQ | Offer request; |
| REP | Offer reply; |
| ACC | Offer accept; |
| TEMP-a | Temporary value a; |
| ID-x | user ID of X; |
| PK-x | Public key of X (X = C or X = M); |
| SK-x | Secret/Private key of X; |
| R-x | Random number (nonce) generated by X; |
| Cert-x | Pubtic key Certificate of X, includes PK-x; |
| K(text) | Encryption of "text" under key K; |
| H(text) | Strong one-way Hash function upon "text", e.g. SHA (Secure Hash Function) or MD5, both described in Bruce Schneier: Cryptography, above; |
| SIGx | Signature of X; |
| {text} | Optional text |

Description of the Basic Process (Transferable Voucher)

The following is a detailed description of the basic process according to the invention as claimed.

1. Consumer Request

A consumer C wishing to obtain a bid/offer from a merchant M for certain merchandise composes the following message:

OFFER-REQUEST=MERCHANDISE-DESCRIPTION, SIG-c, wherein:
MERCHANDISE-DESCRIPTION, MD in the drawings, is the textual description of the desired merchandise including, e.g. quantity, color/size, delivery dates, etc.;
SIG-c=H(MERCHANDISE-DESCRIPTION, R-c)
SIG-c is thus the hash function digest of MERCHANDISE-DESCRIPTION together with a randomly-generated, used-only-once quantity, a nonce R-c. The preferred minimum recommended length for R-c is 64 bits.

A crucial detail is that, although R-c is used in computation of SIG-c, R-c is not included as part of the OFFER-REQUEST message.

Figure 1:
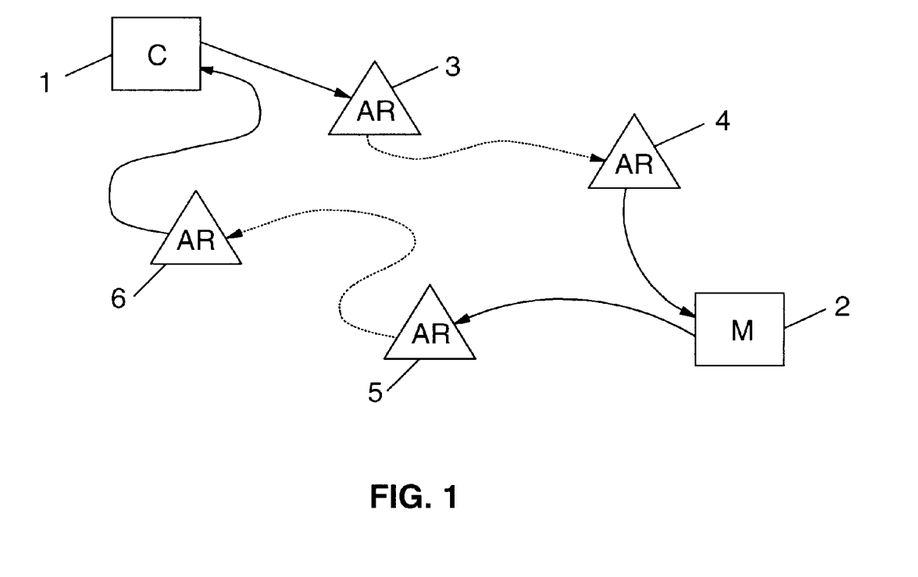
FIG. 1 the general layout of a network in which the invention can be used.

As shown in FIG. 1, after composing OFFER-REQUEST, the prospective consumer (1) uses the anonymous communication service (3, 4), e.g. anonymous remailers, to send the message to the merchant (2) or a number of merchants. Any of them can read the description of the desired merchandise.

2. Merchant Reply

Figure 2A:
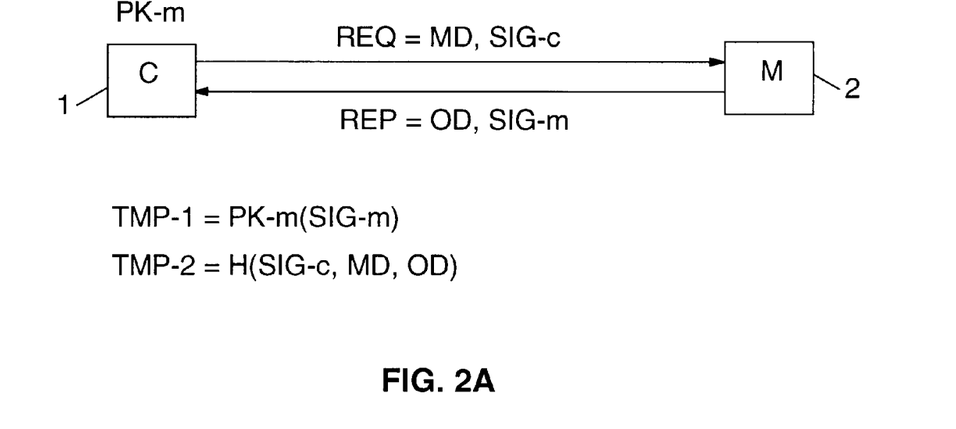
FIG. 2A the data exchange according to a first part of the invention.

As said above, upon receiving OFFER-REQUEST, merchant M is not required to perform any security-related activity. Instead, he/she examines MERCHANDISE-DESCRIPTION and determines whether or not he/she can make a corresponding offer/bid. This process depends both on merchant M and on the type of merchandise specified in the incoming request. If and when the merchant is ready to make an offer, he/she composes the following message:

OFFER-REPLY=OFFER-DESCRIPTION, SIG-m, {H(MERCHANDISE-DESCRIPTION, SIG-c)}, {Cert-m}, wherein:
OFFER-DESCRIPTION (OD in the drawings) is the plain text description of the offer including, e.g. current date/time, price, currency, accepted payment type, delivery schedule, etc.
SIG-m=SK-m[H(SIG-c, MERCHANDISE-DESCRIPTION, OFFER-DESCRIPTION)].
MERCHANDISE-DESCRIPTION and SIG-c are as in OFFER-REQUEST message, both are optional.
CERT-m is the public key certificate of merchant M, if available; it is optional. It may be known to consumer C independently.

Cert-m, the merchant's public key certificate, may not be available in a network, e.g. one that does not provide PKC service. Then, only the bidding process according to the invention may be executable. Transmitting Cert-m is certainly optional; even when it is required for the subsequent sale process, it is quite possible that the customer already has it.

The hash function digest of MERCHANDISE-DESCRIPTION and SIG-c is also optional since its only use is to help customer C to match the outstanding OFFER-REQUEST with the incoming OFFER-REPLY. This is only necessary, in principle, when an asynchronous communication channel is used.

3. Subsequent Actions by Consumer

When the consumer receives OFFER-REPLY, he/she executes the following actions:

a. If applicable, recomputes H(MERCHANDISE-DESCRIPTION. SIG-c) and identifies the matching OFFER-REQUEST.
b. If applicable, verifies the validity, authenticity and data integrity of the merchant's certificate Cert-m. (Techniques for doing this are known, cf. Bruce Schneier: Cryptography, cited above)
c. Examines OFFER-DESCRIPTION for consistency with the corresponding MERCHANDISE-DESCRIPTION and determines whether to accept the offer.
d. If the offer is not accepted, no further actions are taken.
e. If the offer is of interest, consumer C computes:
Temporary value TMP-1
TMP-1=PK-m(SIG-m), where PK-m is the merchant's public key extracted from Cert-m.
Temporary value TMP-2
TMP-2=H(SIG-c, MERCHANDISE-DESCRIPTION, OFFER-DESCRIPTION)
f. Finally, he/she compares TMP-1 and TMP-2 and, if they match, is assured that the offer is genuine.

The above process is shown in FIG. 2A in an abbreviated fashion.

Given that the offer is acceptable and genuine, the consumer—if he/she so wishes—can approach the merchant directly, i.e. without going through the anonymizing process. This is usually the case when goods of a physical nature have to be delivered. Anyway, the consumer may decide to act upon the merchant's offer some time after the initial exchange, e.g. the next day.

If the merchandise is of electronic nature and can be delivered on-line, e.g. some software or data, it may be possible and desirable for consumer C to remain anonymous. This can be done by going through the anonymizing process in the delivery stage again. However, in many cases consumer C will resort to conventional methods of payment (e.g. credit card) in which case his anonymity is likely to be sacrificed.

4. Subsequent Actions

The final step in the blind bidding method according to a further part of the invention involves the merchant verifying the validity of the offer once the consumer decides to accept it. Regardless of how the consumer goes about it, the following five items of information must be communicated to the merchant:

MERCHANDISE-DESCRIPTION
SIG-c
OFFER-DESCRIPTION
SIG-m
R-c

The first four can be taken directly from the aforementioned OFFER-REQUEST and OFFER-REPLY messages. The missing R-c is the hereto secret quantity that was used to compute SIG-c as explained above.

To show his acceptance of the offer, the consumer communicates R-c to the merchant by sending a message:

OFFER-ACCEPT=R-c, OFFER-DESCRIPTION wherein OFFER-DESCRIPTION is included to help the merchant identify the appropriate outstanding offer.

Now, in order to establish the validity of the bid, merchant M does the following. He/she a. computes temporary value TMP-3=H(MERCHANDISE-DESCRIPTION, R-c); and
b. if TMP-3=SIG-c, he/she is satisfied that SIG-c is genuine and the bid valid.

The following steps c and d are optional and only executed if the merchant does not keep state of SIG-m. In this case, SIG-m must be included in the OFFER-ACCEPT communication.

c. Merchant M may compute

TMP-5=SK-m[H(SIG-c, MERCHANDISE-DESCRIPTION, OFFER-DESCRIPTION)].

d. If TMP-5=SIG-m, merchant M is satisfied that SIG-m is his/her own signature and thus the offer is genuine.

Figure 2B:
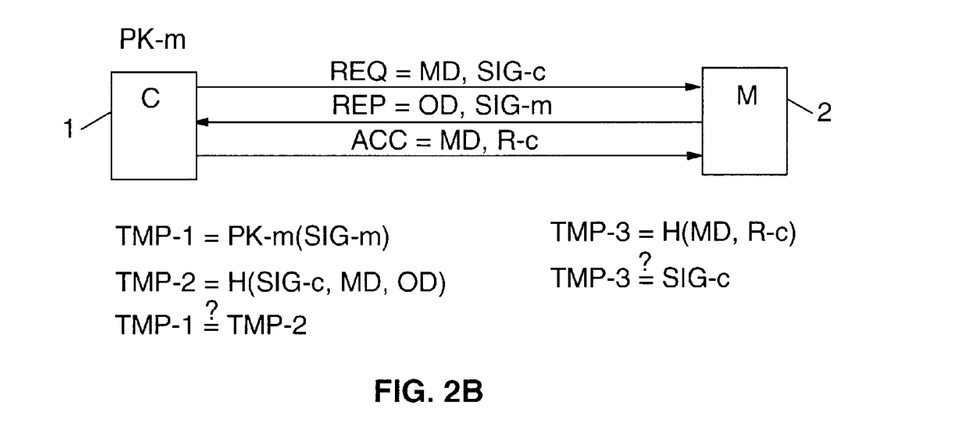
FIG. 2B the data exchange according to a second part of the invention.

In this case, consumer C may transfer his/her "voucher" for the intended purchase to another potential consumer. Merchant M will not notice such a voucher transfer. The complete process according to the above is shown in FIG. 2B.

Description of Extended Process (Non-Transferable Voucher)

The following is a detailed description of a more elaborate process. The described implementation offers additional advantages as described below.

The main difference to the basic process described above is due to consumer C having a public key certificate and the corresponding public/private key pair. Because the consumer is thus able to sign his/her request for a bid or offer, he/she can—at a later time—prove to merchant M that he/she is the only one who could have generated the original request and who received the merchant's offer.

Moreover, merchant M is now able to make sure that the offer and the merchandise are given to the same consumer, i.e., consumer C cannot freely transfer the offer/bid to another consumer. This entails consumer C revealing his/her identity to the merchant M, but only when the consumer is ready to purchase the merchandise; not before.

At the same time, due to the construction of the process, merchant M receiving multiple requests for offers/bids from the same consumer C is unable to recognize this consumer as being one and the same.

1. Consumer Request

Consumer C wishing to obtain a bid/offer from merchant M for certain merchandise composes the following message, as above:

OFFER-REQUEST=(MERCHANDISE-DESCRIPTION, SIG-c)

wherein:

MERCHANDISE-DESCRIPTION is the textual description of the desired merchandise including, e.g. quantity, color/size, delivery dates, etc.; and SIG-c=SK-c[H(MERCHANDISE-DESCRIPTION, R-c)].

SIG-c is thus the signature of the hash function digest of MERCHANDISE-DESCRIPTION together with a randomly-generated, used-only-once quantity, a nonce R-c. The preferred minimum recommended length for R-c is 64 bits.

As before, even though R-c is used in computation of SIG-c, R-c is not included as part of the OFFER-REQUEST message.

After composing OFFER-REQUEST, the prospective consumer (1) uses the anonymous communication service (3, 4) to send the message to the merchant (2) or a number of merchants. Any of them can read the description of the desired merchandise.

2. Merchant Reply

This step is identical to that in the basic process as described above and shall thus not be repeated here.

3. Subsequent Actions by Consumer

This step is also identical to that in the basic process described above and shall thus not be repeated here.

4. Subsequent Actions

The final step in the blind bidding method according to this part of the invention involves merchant M verifying the validity of the offer once consumer C decides to accept it. Regardless of how the consumer goes about it, the following six items of information must be communicated to the merchant; Cert-c is additional as compared to the basic process above.

MERCHANDISE-DESCRIPTION
SIG-c
OFFER-DESCRIPTION
SIG-m
Cert-c
R-c

The first four can be taken directly from the aforementioned OFFER-REQUEST and OFFER-REPLY messages. Cert-c is the public key certificate of consumer C and R-c is the hereto secret quantity that was use to compute SIG-c as explained above.

The consumer communicates R-c to the merchant by sending a message:

OFFER-ACCEPT=R-c, OFFER-DESCRIPTION, {Cert-c} wherein OFFER-DESCRIPTION is included in order to help the merchant identify the appropriate outstanding offer. The customer's public key certificate Cert-c is optional.

In order to establish the validity of the bid, merchant M does the following. He/she a. verifies the validity, authenticity and data integrity of the consumer's public key certificate Cert-c,
b. extracts the consumer's public key PK-c from Cert-c,
c. computes value TMP-3=H(MERCHANDISE-DESCRIPTION, R-c), and
d. computes temporary value TMP-4=PK-c(SIG-c).
e. If TMP-3=TMP-4, merchant M is satisfied that SIG-c is the genuine signature of consumer C and the bid valid.

Steps f and g are optional and only executed if the merchant does not keep state of SIG-m.

f. Finally, merchant M may compute

TMP-5=SK-m[H(SIG-c, MERCHANDISE-DESCRIPTION, OFFER-DESCRIPTION)].

g. If TMP-5=SIG-m, he/she is satisfied that SIG-m is his/her own signature and thus the offer is genuine.

Variations

Figure 3:
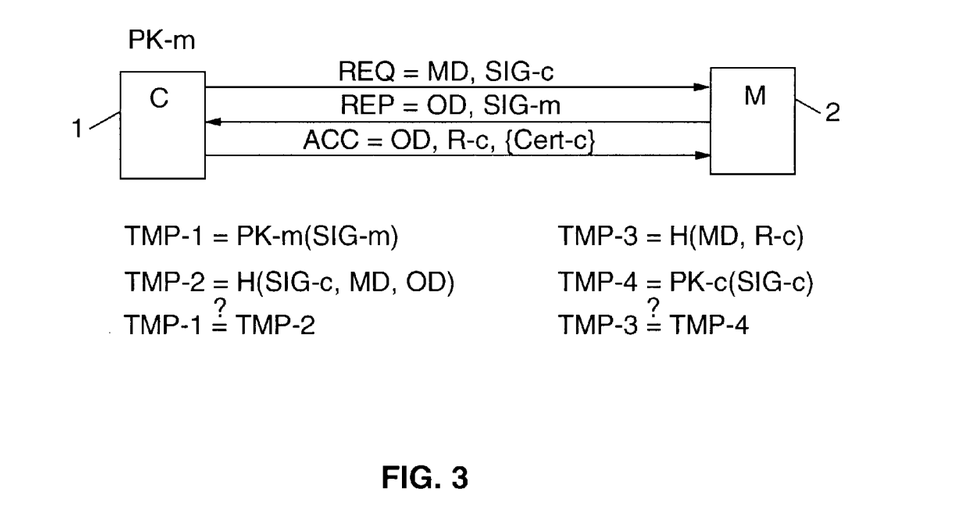
FIG. 3 the data exchange according to a modification of the invention.

The method outlined in the previous sections can be enhanced/amended in the following way:

In the event that the consumer has a priori knowledge of the merchant's certificate (Cert-m), the OFFER-REQUEST message can be enciphered under the merchant's public key, PK-m. This is indicated in FIGS. 2A, 2B, and 3. The resulting secrecy of the message offers protection against snoopers and eavesdroppers.

Furthermore, secrecy/privacy of the merchant's reply can be obtained if the consumer encloses a secret key in the encrypted OFFER-REQUEST, thus allowing the merchant to use this key for encrypting OFFER-REPLY.

Summary of Security Properties

The blind bidding method has the following security properties—except for the last one, all of them are valid for both the basic and the extended processes.

Anonymity of consumer C is maintained, e.g. while browsing before purchase.

Authenticity, data integrity and non-repudiation of the offer by merchant M is warranted.

Multiple requests by the same consumer cannot be linked. This is a particularly important feature which essentially prevents the merchant M from "recognizing" a browsing customer as someone who has previously made purchases, even if the merchant possesses that customer's certificate.

Authenticity and non-repudiation of the offer request by consumer M is given.

Optionally, privacy (from eavesdroppers) of ensuing communication is maintained.

Use in Products

As mentioned above, the blind bidding method according to the invention can be used in both asynchronous, e.g. e-mail based, and synchronous (e.g. http- or WWW-based) electronic commerce.

In most asynchronous environments, the necessary infrastructure already exists, i.e. there are a number of functioning anonymous remailers and several public key certification schemes. Electronic commerce via synchronous communication is currently gathering momentum and is widely believed to be the way of the future. The popularity of WWW-based commerce is a striking example. The sole missing ingredient is a synchronous protocol anonymizer. Assuming WWW, an anonymizer is a relay that takes incoming http requests and, acting as a proxy, connects them to desired points of interest while preserving the anonymity of the actual incoming end-points. Of course, the replies must be similarly mapped back.

A substantial part of this functionality is already provided by so-called "protocol firewalls". IBM's NetSP Secure Network Gateway is an example; as described above, it can easily be enhanced to serve as anonymizer in both directions.

Pseudo-code for the two Processes

The following is a listing of pseudo-code for the basic process (transferable voucher) as described above. A person skilled in the art should be able to adapt this code to or implement it in a given network environment.

CONSUMER DEVICE

R-c=generate-random-number ( );
/* MERCHANDISE-DESCRIPTION assumed available */
/* || - - denotes the concatenation operator */
SIG-c=hash-function (MERCHANDISE-DESCRIPTION R-c);
OFFER-REQUEST=MERCHANDISE-DESCRIPTION||SIG-c;

```
SEND (merchant, OFFER-REQUEST);
receive-reply(OFFER-REPLY);
/* see MERCHANT DEVICE below */
if (valid(Cert-m))
    parse(OFFER-REPLY, OFFER-DESCRIPTION, SIG-
      m);
else
    parse(OFFER-REPLY, OFFER-DESCRIPTION, SIG-
      m, Cert-m);
    if (not valid(Cert-m))
      return-error (INVALID-CERTIFICATE);
if (not match(MERCHANDISE-DESCRIPTION,
    OFFER-DESCRIPTION)
    return-error (INVALID-OFFER);
parse(Cert-m, PK-m);
TMP-1=Encrypt (PK-m, SIG-m);
TMP-2=hash-function(SIG-c||MERCHANDISE-
    DESCRIPTION||OFFER-DESCRIPTION);
if (TMP-1<>TMP-2)
return-error (INVALID-SIGNATURE);
    /* at this point, the consumer device waits for the con-
      sumer to accept the offer */
    if (not offer-accepted(OFFER-DESCRIPTION)
      return( ); /* terminate this process */
    /* otherwise, offer is accepted */
    OFFER-ACCEPT=R-c;
    SEND (merchant, OFFER-ACCEPT);
    . . . /* at this point, the payment process is invoked */

MERCHANT DEVICE receive-request(OFFER-REQUEST);
parse(OFFER-REQUEST, MERCHANDISE-
    DESCRIPTION, SIG-c);
if (not valid-merchandise(MERCHANDISE-
    DESCRIPTION)) return-error (INVALID-
    MERCHANDISE);
else /* compute SIG-m */
    compose-offer (MERCHANDISE-DESCRIPTION,
      OFFER-DESCRIPTION);
    SIG-m=sign-text (SK-m, SIG-c||MERCHANDISE-
      DESCRIPTION||OFFER-DESCRIPTION);
    OFFER-REPLY=OFFER-DESCRIPTION||SIG-m;
    /* optionally, append Cert-m to OFFER-REPLY */
    if (not consumer-has-Cert-m)
      OFFER-REPLY=OFFER-REPLY
    send (consumer, OFFER-REPLY)
/* merchant waits until offer is accepted */
receive-accept(OFFER-ACCEPT);
TMP-3=hash-function(MERCHANDISE-
    DESCRIPTION||R-c);
if (SIG-c<>TMP-3)
    return-error (INVALID-SIG-c);
. . . /* at this point, the payment process is invoked */
This is the end of the code listing for the "Basic Process".
The pseudo-code for the "Extended Process" (non-
transferable voucher), as described above, follows.

CONSUMER DEVICE

R-c=generate-random-number ( );
SIG-c=sign-text (hash-function (MERCHANDISE-
    DESCRIPTION||R-c) TMP-0, MERCHANDISE-
    DESCRIPTION, R-c);
OFFER-REQUEST=MERCHANDISE-
    DESCRIPTION||SIG-c;
SEND(merchant, OFFER-REQUEST);
receive-reply(OFFER-REPLY);
/* see MERCHANT DEVICE below */
if (valid(Cert-m))
    parse(OFFER-REPLY, OFFER-DESCRIPTION, SIG-
      m);
else
    parse(OFFER-REPLY, OFFER-DESCRIPTION, SIG-
      m, Cert-m);
    if (not valid(Cert-m))
      return-error (INVALID-CERTIFICATE);
if (not match(MERCHANDISE-DESCRIPTION,
    OFFER-DESTINATION)
    return-error (INVALID-OFFER);
parse(Cert-m, PK-m);
TMP-1=Encrypt (PK-m, SIG-m);
TMP-2=hash function (SIG-c||MERCHANDISE-
    DESCRIPTION||OFFER-DESCRIPTION);
if (TMP-1<>TMP-2)
    return-error (INVALID-SIGNATURE);
/* at this point, the consumer device waits for the con-
    sumer to accept the offer */
if (not offer-accepted(OFFER-DESCRIPTION)
    return( ) ; /* terminate this process */
/* otherwise, offer is accepted */
/* Cert-c is assumed available */
OFFER-ACCEPT=R-c||Cert-c;
SEND (merchant, OFFER-ACCEPT);
. . . /* at this point, the payment process is invoked */

MERCHANT DEVICE receive-request(OFFER-REQUEST);
parse(OFFER-REQUEST, MERCHANDISE-
    DESCRIPTION, SIG-c);
if (not valid-merchandise(MERCHANDISE-
    DESCRIPTION))
    return-error (INVALID-MERCHANDISE);
else /* compute SIG-m */
    compose-offer (MERCHANDISE-DESCRIPTION,
      OFFER-DESCRIPTION);
    SIG-m=sign-text (SK-m, hash-function (SIG-
      c||MERCHANDISE-DESCRIPTION||OFFER-
      DESCRIPTION));
    OFFER-REPLY=OFFER-DESCRIPTION||SIG-m;
    /* optionally, append Cert-m to OFFER-REPLY */
    if (not consumer-has-Cert-m)
      OFFER-REPLY=OFFER-REPLY||Cert-m;
    send (consumer, OFFER-REPLY)
/* merchant waits until offer is accepted */
receive-accept(OFFER-ACCEPT);
parse(OFFER-ACCEPT, R-c, Cert-c);
if (not valid(Cert-c))
    return-error (INVALID-Cert-c);
parse(Cert-c, PK-c);
TMP-3=hash-function(MERCHANDISE-
    DESCRIPTION||R-c);
```

TMP-4=Encrypt (PK-c, SIG-c);
if (TMP-3<>TMP-4)
   return-error (INVALID-SIG-c);
... /* at this point, the payment process is invoked */
This is the end of the listing for the "extended pocess".

Though the best modes contemplated for carrying out this invention have been shown and described herein, it will be apparent that modifications and variations may be made without departing from the subject of this invention.

What is claimed is:

1. A method for anonymous, provable information exchange between a sender and an addressee in a computer network, the computer network providing a public key infrastructure, preferably with certification, and an anonymous communication channel available between network users, said method comprising the following steps:

said sender C composes an offer request REQ with a subject or merchandise description MD and a digital signature SIG-c of C, REQ=(MD,SIG-c), said REQ is transmitted via said anonymous communication channel to at least one addressee M, said addressee M composes a reply REP with an offer description OD and its digital signature SIG-m, said digital signature SIG-m being computed over a selection of quantities comprising at least one of MD, OD, SIG-c, REP=(OD, SIG-m), and further including M's public key PK-m or public key certificate Cert-m, said sender C, upon receiving said reply REP, uses M's public key PK-m, known, transmitted, or extracted from said public key certificate Cert-m, to encrypt said received SIG-m, thus determining a first temporary value TMP-1, TMP-1=PK-m(SIG-m), said sender C computes a concatenation of said selection of quantities on which said signature SIG-m is based, thus determining a second temporary value TMP-2

TMP-2=H(SIG-c/MD/OD), said sender C compares said temporary values TMP-1 and TMP-2, a match indicating genuineness of said offer.

2. The method according to claim 1, wherein
the digital signature SIG-c of the sender C is a hash function of the MD and/or a randomly generated nonce R-c, SIG-c=H(MD/R-c).

3. The method according to claim 1, wherein
the digital signature SIG-c of the sender C is an encryption of the MD under a randomly generated nonce R-c as key, SIG-c=R-c(MD).

4. The method according to claim 1, wherein
the digital signature SIG-c of the sender C is a hash function of the MD and/or a randomly generated nonce R-c, encrypted under C's secret key SK-c, SIG-c=SK-c[H(MD/R-c)].

5. The method according to any of the claims 2 to 4, wherein
the nonce R-c of sender C is transmitted to the addressee M,
the addressee M computes a hash function of said MD and R-c, thus determining a third temporary value TMP-3, TMP-3=H(MD, R-c), said addressee M compares said temporary value TMP-3 and SIG-c, a match indicating genuineness of said SIG-c.

6. A method according to claim 5, wherein
the addressee uses PK-c, either known, received, or extracted from Cert-c, to encrypt the received SIG-c, thus determining a fourth temporary value TMP-4, TMP-4=PK-c(SIG-c), said addressee compares said temporary values TMP-3 and TMP-4, a match indicating genuineness of said SIG-c.

7. The method according to claim 1, wherein
the digital signature SIG-m of the addressee M is a hash function of the chosen selection of quantities of MD, OD, SIG-c, SIG-m=H(SIG-c/MD/OD), and the concatenation to derive TMP-2 is a hash function of said same selection of quantities used to compute said SIG-m, TMP-2=H(SIG-c/MD/OD).

8. The method according to any of the claims 2 to 4, wherein
the digital signature SIG-m of the addressee M is a hash function of the chosen selection of quantities of MD, OD, SIG-c, encrypted under M's secret key SK-m, SIG-m=SK-m(H(SIG-c/MD/OD)).

9. The method according to claim 1, wherein,
the sender has an a priori knowledge of the addressee's public key PK-m, and the addressee M encrypts the offer description OD with its secret key SK-m and transmits a reply REP=(SK-m(OD), SIG-m).

10. The method according to claim 1, wherein
the sender C further transmits its user identification ID-c to the addressee M as identity proof.

11. The method according to any of the claims 2 to 4, wherein
the sender C further transmits the nonce R-c to the addressee M, enabling identification of said sender C by verification of its signature SIG-c.

12. The method according to claim 1,
wherein the sender C and/or the addressee M are keeping state in that at least one of them stores incoming requests REQ and/or replies REP.

13. A system for anonymous, provable information exchange between a sender and an addressee in a computer network, the computer network providing a public key infrastructure, preferably with certification, and an anonymous communication means between network users, said system comprising:

means in said sender C for composing an offer request REQ=(MD, SIG-c) with a subject or merchandise description MD and a digital signature SIG-c of C, means for making said offer request REQ anonymous, means for transmitting said anonymous offer request to at least one addressee M, means in said addressee M for composing a reply REP=(OD, SIG-m) with an offer description OD and a digital signature SIG-m of M, said digital signature SIG-m being computed over a selection of quantities comprising at least one of MD, OD, SIG-c, and further including M's public key PK-m or public key certificate Cert-m, means in said sender C, upon receiving said reply REP, for encrypting said received SIG-m and determining a first temporary value TMP-1=PK-m(SIG-m), using M's public key PK-m, known, transmitted, or extracted from said public key certificate Cert-m, means for computing a concatenation of said selection of quantities on which said signature SIG-m is based and determining a second temporary value TMP-2=H(SIG-c/MD/OD), means in said sender for comparing said first and said second temporary values TMP-1 and TMP-2, a matching of TMP-1 and TMP-2 indicating genuineness of said offer.

* * * * *